US012645991B2

(12) United States Patent
Datt et al.

(10) Patent No.: US 12,645,991 B2
(45) Date of Patent: Jun. 2, 2026

(54) MODEL-AGNOSTIC SYSTEM FOR AUTOMATIC INVESTIGATION OF THE IMPACT OF NEW FEATURES ON PERFORMANCE OF MACHINE LEARNING MODELS

(71) Applicant: Google LLC, Mountain View, CA (US)

(72) Inventors: Madhav Datt, Mountain View, CA (US); Nikhil Shirish Ketkar, Bengaluru (IN); Arooshi Verma, Bengaluru (IN)

(73) Assignee: GOOGLE LLC, Mountain View, CA (US)

( * ) Notice: Subject to any disclaimer, the term of this patent is extended or adjusted under 35 U.S.C. 154(b) by 734 days.

(21) Appl. No.: 18/080,351

(22) Filed: Dec. 13, 2022

(65) Prior Publication Data

US 2024/0104429 A1     Mar. 28, 2024

(30) Foreign Application Priority Data

Sep. 27, 2022     (IN) .............................. 202221055360

(51) Int. Cl.
*G06N 20/00*          (2019.01)
*G06F 11/34*          (2006.01)

(52) U.S. Cl.
CPC ......... *G06N 20/00* (2019.01); *G06F 11/3495* (2013.01)

(58) Field of Classification Search
CPC ...... G06N 20/00; G06N 3/084; G06N 3/0985; G06N 3/10; G06N 3/045; G06F 11/3495
See application file for complete search history.

(56) References Cited

U.S. PATENT DOCUMENTS

| | | | | |
|---|---|---|---|---|
| 2020/0387401 A1* | 12/2020 | Zhou | ..................... | G06F 9/5027 |
| 2023/0049418 A1* | 2/2023 | Saha | ..................... | G06N 3/0464 |
| 2023/0123045 A1* | 4/2023 | Kim | ..................... | G06N 20/10 707/740 |
| 2023/0178212 A1* | 6/2023 | Gong | ..................... | G16H 20/60 705/2 |
| 2024/0176784 A1* | 5/2024 | Allouche | ............... | G06F 17/18 |

* cited by examiner

*Primary Examiner* — Maher N Algibhah

(74) *Attorney, Agent, or Firm* — DORITY & MANNING, P.A.

(57)          ABSTRACT

Provided are computing systems, methods, and platforms that automatically investigate and analyze the impact of new features or signals on the performance of a machine learning model by producing a ranked list of the most impactful features from input of a set of candidate features. In particular, one example computing system can import a training dataset associated with a user. The computing system can train a machine learning model for the training dataset and generate baseline metrics for the machine learning model. Correlations between features or signals in the training dataset can be identified and the features or signals can be grouped into clusters based on the correlations. The computing system can determine the importance of each cluster and each feature or signal. A ranked list of signals and their importances can be exported in decreasing order of machine learning model performance lift based on cluster importance and signal importance.

20 Claims, 10 Drawing Sheets

MODEL-AGNOSTIC SYSTEM FOR AUTOMATIC INVESTIGATION OF THE IMPACT OF NEW FEATURES ON PERFORMANCE OF MACHINE LEARNING MODELS

FIELD

The present disclosure relates generally to machine learning. More particularly, the present disclosure relates to computing systems, methods, and platforms that automatically investigate and analyze the impact of new features or signals on the performance of a machine learning model by producing a ranked list of the most impactful features from input of a set of candidate features.

BACKGROUND

Machine learning is a field of computer science that includes the building and training (e.g., via application of one or more learning algorithms) of analytical models that are capable of making useful predictions or inferences on the basis of input data. Machine learning is based on the idea that systems can learn from data, identify patterns, and make decisions with minimal human intervention.

Various machine learning libraries exist which assist software developers in generating and deploying machine learning models. In particular, in computer science, a library is a collection of non-volatile resources used by computer programs, often for software development. These may include configuration data, documentation, help data, message templates, pre-written code and subroutines, classes, values, or type specifications.

A software developer or other user or individual can interact with a software library to build and deploy a machine learning pipeline. A machine learning pipeline can include computer-readable code that automates the workflow it takes to produce and/or deploy a machine learning model. Machine learning pipelines can include multiple sequential steps that do everything from data extraction and preprocessing to model training and deployment.

However, building and/or deploying a machine learning pipeline can be a challenging and time-consuming task. In particular, while certain existing machine learning libraries or other tools provide powerful components that span the entire machine learning workflow, these resources are often highly complex and may be accessible only to individuals or teams with a high level of infrastructure sophistication and engineering resources to invest into data wrangling, pipeline configuration & architecture, and modeling decisions.

While for certain sophisticated users this level of complexity may be workable, a large number of software developers or other users do not have the level of expertise to easily use such complicated resources. Further, even for sophisticated users, designing, training, and deploying a machine learning model with an associated deployment pipeline can require a significant amount of time, such as weeks to months.

A machine learning model uses signals or features as the input variables. Performance of a machine learning model is a function of the signals it uses. Adding new signals that improve the predictive performance of a machine learning model is a primary activity of a software developer or other user or individual. Machine learning pipelines can include multiple sequential steps that do everything from data extraction and preprocessing to model training and deployment.

However, adding new signals to a machine learning model is typically a time-consuming, multi-step process that involves a significant amount of time and effort by a software developer. In particular, the number of signals that can potentially be added to a machine learning model is large. Adding new signals may also require experimenting with multiple different versions of the same input information. Therefore, a software developer must experiment with a large number of signals before finding a new signal that can lead to impactful improvements to the model.

For example, in some settings, adding a new signal to a machine learning model may require: (1) signal logging/offline generation, (2) offline experimentation with the model, (3) headroom/lift analysis, (4) plumbing the signal into a data pre-processing component, (5) data backfilling (if not purely inferred signal), (6) addition to a TFX pipeline, (7) shadow experimentation, and (8) launch approvals and product launch.

Experimenting with new signals also requires that a software developer be familiar with internal systems of the machine learning model, such as data stores, label sources, data generation pipelines, model training pipelines, nuances of test data sets, and product-specific metrics. Therefore, a software developer must be directly involved in developing the machine learning model in order to experiment with adding new signals to the model.

Software developers spend considerable time experimenting with and analyzing new signals before adding them to the machine learning model. Further, even for a team of software developers, this process can take a significant amount of time, such as weeks or months. Therefore, improved systems which facilitate the investigation and analysis of the impact of new signals on the performance of a machine learning model are desired.

SUMMARY

Aspects and advantages of embodiments of the present disclosure will be set forth in part in the following description, or can be learned from the description, or can be learned through practice of the embodiments.

According to an example embodiment, a computing system for automatic analysis of signals for machine learning models can include one or more processors. The computing system can further include one or more non-transitory computer-readable media that collectively store instructions that, when executed by the one or more processors, cause the computing system to perform operations. The operations can include importing a training dataset associated with a user. The operations can further include training a machine learning model for the training dataset. The operations can further include generating baseline metrics for the machine learning model. The operations can further include identifying correlations between signals in the training dataset. The operations can further include grouping the signals into clusters based on the correlations. The operations can further include identifying the importance of each cluster. The operations can further include identifying the importance of each signal. The operations can further include returning a list of signals and their importances in decreasing order of machine learning model performance lift based on cluster importance and signal importance.

According to another example embodiment, a computer-implemented method for automatic analysis of signals for machine learning models can be performed by one or more computing devices and can include importing a training dataset associated with a user. The computer-implemented method can further include training a machine learning model for the training dataset. The computer-implemented method can further include generating baseline metrics for the machine learning model. The computer-implemented method can further include identifying correlations between signals in the training dataset. The computer-implemented method can further include grouping the signals into clusters based on the correlations. The computer-implemented method can further include identifying the importance of each cluster. The computer-implemented method can further include identifying the importance of each signal. The computer-implemented method can further include returning a list of signals and their importances in decreasing order of machine learning model performance lift based on cluster importance and signal importance.

According to another example embodiment, one or more non-transitory computer-readable media can collectively store instructions that, when executed by one or more processors of a computing system, cause the computing system to perform operations. The operations can include importing a training dataset associated with a user. The operations can further include training a machine learning model for the training dataset. The operations can further include generating baseline metrics for the machine learning model. The operations can further include identifying correlations between signals in the training dataset. The operations can further include grouping the signals into clusters based on the correlations. The operations can further include identifying the importance of each cluster. The operations can further include identifying the importance of each signal. The operations can further include returning a list of signals and their importances in decreasing order of machine learning model performance lift based on cluster importance and signal importance.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of implementations directed to one of ordinary skill in the art is set forth in the specification, which makes reference to the appended figures, in which.

Figure 1:
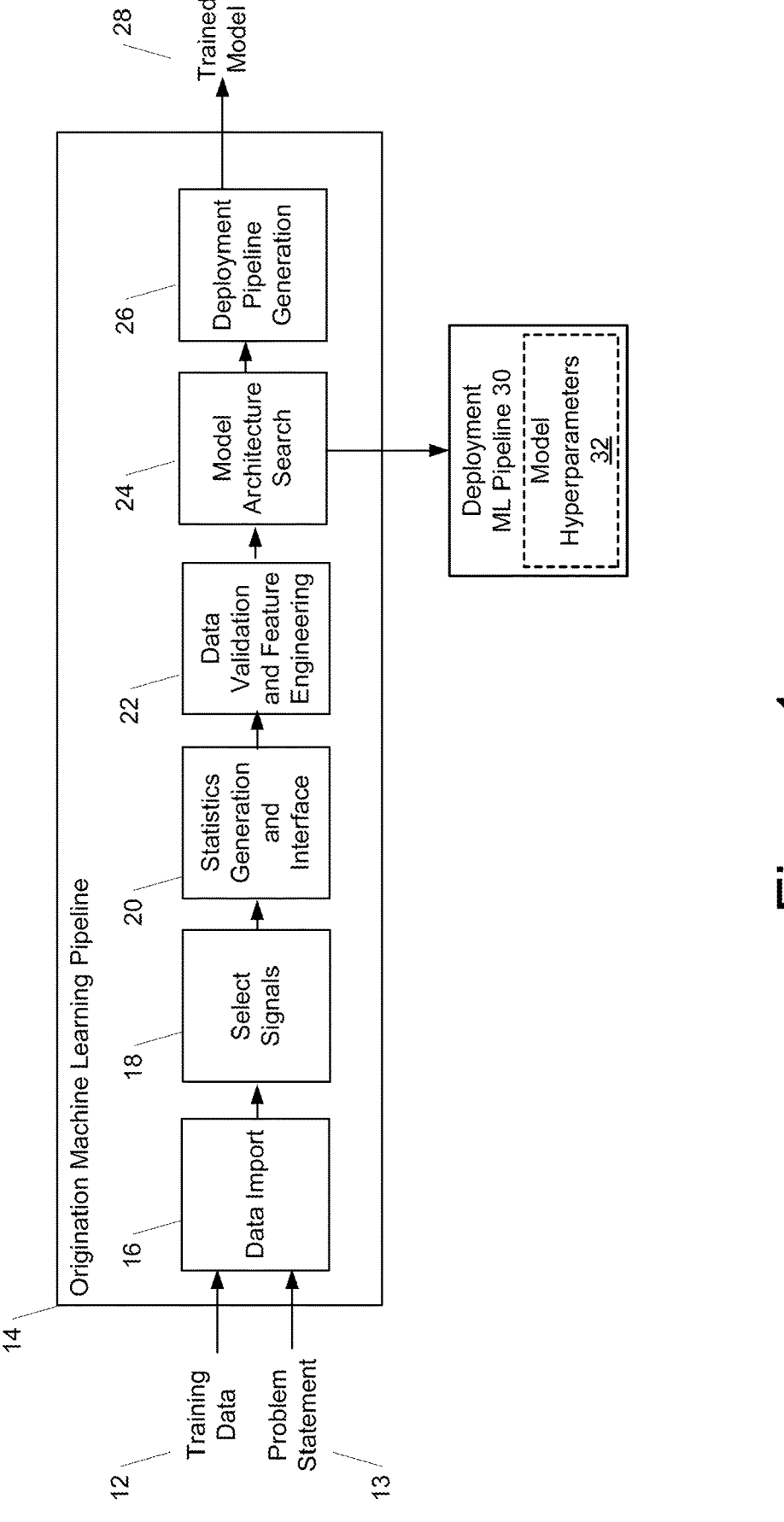
FIG. 1 depicts a block diagram of an example origination machine learning pipeline according to example implementations of the present disclosure.

Reference numerals that are repeated across plural figures are intended to identify the same features in various implementations.

DETAILED DESCRIPTION

Overview

Generally, the present disclosure is directed to computing systems, methods, and platforms that automatically produce a ranked list of the most impactful features for machine learning models and deployment pipelines from input of a set of candidate features. In particular, one example computing system can import a single feature or a set of candidate features. The computing system can measure machine learning model performance lift in terms of either standard machine learning metrics or user-specified custom metrics over a provided dataset. The computing system can automatically generate a ranked list of the most impactful candidate features for the machine learning model based on the model performance lift. The computing system can provide the user with a recommended subset of candidate features to add to the machine learning model. Based on the recommended subset of candidate features, a software development team can decide which features or signals to add to the machine learning model.

Thus, the proposed system can supply the user with an estimated impact in terms of machine learning model performance lift from adding each candidate feature from the set of candidate features. The user can weigh the expected performance lift against the requirements to produce the feature and support software development teams in making a decision on the investment of software developers.

Machine learning developers desire an improvement in the performance of an existing machine learning model by adding new features or signals. The proposed system provides large value to software development teams because the software developer time requirement to train a model with new candidate features, analyze performance lift, and adjust the feature is reduced from weeks to hours. For example, when using the traditional drop column method of comparing the performance of the candidate model with a subset of the candidate features against the production model, if a software developer wants to experiment with four new candidate features for a machine learning model, they need try a total of 24, or 16, combinations, which requires training and analyzing 16 new models. The proposed system reduces the total number of machine learning models trained from O(2N) for a set of N new candidate features to O(1). Thus, the time to train machine learning models is reduced from weeks to days. Furthermore, an experiment using the proposed system takes no longer than 2T time, where T is the time required to train the given machine learning model on its standard dataset. As a result, the total software engineering time required to run an experiment and analyze results with the proposed system may be no more than two hours. Additionally, fewer computing resources are needed because of the reduced time required to train machine learning models when using the proposed system.

The proposed system provides large value to entry-level users of a machine learning model who are not familiar with the internal systems or infrastructure of the machine learning model. Software developers who are not familiar to the machine learning model can use the proposed system to experiment with a new signal for the machine learning model without interacting directly with the internal systems or infrastructure of the machine learning model.

In another example aspect, the importance of the candidate features can be determined based on correlations between contiguous-contiguous features within the set of candidate features or correlations between categorical-categorical features within the set of candidate features. Additionally, the importance of the candidate features can be determined based on contiguous-contiguous or categorical-categorical correlations between existing model features and features in the set of candidate features. The proposed system can identify and exclude candidate features that are highly correlated with the existing machine learning model signals by clustering highly correlated signals within the set of candidate features into non-overlapping clusters in order to compute the importance of these clusters as a whole. The proposed system assigns a quantitative confidence value for each cluster. Thus, the proposed system facilitates meaningfully and accurately attributing feature importance across highly correlated features. As such, the developer can use the values as a useful analytical tool, as incorrect or lower confidence clustering can lead to lower values of signals incorrectly receiving high feature importances.

In another aspect, the estimated value of the machine learning model performance lift is computed in terms of feature importance metrics for each of the correlated clusters of signals and for each candidate signal. The feature importance metrics can include computing feature importance in terms of standard machine learning model performance lift metrics without custom code, such as area under the precision-recall curve (AUC-PR). For example, TensorFlow custom metrics that inherit from Keras metrics or standard TensorFlow Model Analysis metrics can be supported without custom code. Additionally, the user can provide a function to the proposed system to obtain the feature importance in terms of the delta or performance lift over any custom performance metric that can be computed over the test dataset and based on the available columns.

Another aspect of the present disclosure is directed to generating a list of all the candidate features in the set of candidate features in ranked order by decreasing feature importance metric. In particular, the ranked list can include a descriptive signal name, the expected machine learning model performance lift due to the signal as expressed as a function of the feature importance metric, and a quantified level of correlations between the clustered signals for correlated feature clusters.

In another example aspect, the proposed system can recommend to the user an optimal subset of signals from the set of candidate features that can be added to the machine learning model. The optimal subset of signals can be selected based solely on machine learning model performance lift instead of an optimization based on engineering effort or software developer cost to productionize the signals. Thus, the proposed system can suggest low value signals to be removed from the machine learning model.

In another example aspect, the proposed system can compute the machine learning model performance lift metrics over any test dataset that is provided by the user of the system. Additionally, the user can specify data slices on an existing dataset or a dataset provided by the user. Data slicing can be based on equality relationships between the data in the available columns of the dataset. Thus, the user can provide existing data slicing configurations to obtain machine learning model performance lift metrics for new signals over the custom data slices provided by the user.

Another aspect of the present disclosure is directed to verification of the results exported by the proposed system. In order to prevent the possibility of false positive results, the proposed system can train a separate model with the old signals, which already exist in the machine learning model, and selected candidate signals. The relevant performance metrics can then be computed on said test dataset and the proposed system can provide a comparison and plots of the machine learning model performance lift against the existing machine learning model. Thus, software developer commitments for signal production are decreased as a result of the result verification. Furthermore, the candidate machine learning model that is produced is usable by downstream components of the machine learning pipeline.

In another example aspect, the user can input training datasets into the proposed system by using a user interface. The user interface can present the user with the results of the top signals from the set of candidate signals and the analysis of said top signals. Furthermore, while the experiment is running, the user does not need to maintain a connection with the user interface. The results of the top signals produced by the proposed system can then be used by downstream components of the machine learning pipeline.

Another example aspect of the present disclosure is directed to system features that reduce the need for the manual intervention by a software developer or other user that is necessary in order to operate the proposed system. For example, in some implementations, the only inputs required from a software developer are to provide the initial inputs of the training dataset and analyze the final results produced by the system.

In another example aspect, the proposed system can be packaged into a custom TensorFlow Extended (TFX) component that can be added to a TFX machine learning pipeline. For example, the custom TFX component can use various relevant data slices from other TFX components as input and generate and export a trained candidate machine learning model with the top candidate signals. The output produced by the custom TFX component can then be used by downstream components of the TFX machine learning pipeline.

In another example aspect, some or all of the functionality described herein can be requested and executed via an application programming interface (API). For example, the user can request and receive the ranked list of signals and their importances from the proposed system via the API. Such an API can require minimal software developer time and effort in order to implement the proposed system and generate the ranked list of signals and their importances.

With reference now to the Figures, example implementations of the present disclosure will be discussed in greater detail.

Example Origination Machine Learning Pipeline

FIG. 1 depicts an example origination ML pipeline 14. The example origination ML pipeline 14 illustrated in FIG. 1 can be configured to receive training data 12 and, optionally, a problem statement 13 from a user. Execution of origination ML pipeline 14 can result in generation and exportation of a trained model 28 and a deployment ML pipeline 30 that is configured to enable deployment of the trained model 28. In at least one implementation, execution of origination ML pipeline 14 can result in generation and exportation of trained model 28, deployment ML pipeline 30, and/or model hyperparameters 32 that can correspond to and/or constitute a subset of hyperparameters of deployment ML pipeline 30 and/or trained model 28. In one or more implementations, origination ML pipeline 14 and deployment ML pipeline 30 can each include computer-readable code that automates the workflow it takes to produce and/or run trained model 28.

More particularly, a user can refer to any individual, organization, or computing system operating on behalf of an individual or organization. Example users of the proposed systems can include engineers, analysts, product managers, researchers, platform developers, etc. Users can interact with the proposed system via a dedicated user interface and/or via an API with defined API calls for certain services. In some implementations, a user can interact with origination ML pipeline 14 via a graphical user interface (GUI) and/or via a programmatic API. For example, in one implementation, an ML platform that provides ML services for various users can request and receive trained model 28, deployment ML pipeline 30 (e.g., including model hyperparameters 32), and/or any of the pipeline generation services described herein from origination ML pipeline 14 via a programmatic API. In this example implementation, origination ML pipeline 14 can receive (e.g., import) training data 12 and, optionally, problem statement 13 from such an ML platform user via the programmatic API, where training data 12 can be associated with the ML platform user and/or one or more individual users associated with the ML platform user. In this example implementation, origination ML pipeline 14 can further export trained model 28 and/or deployment ML pipeline 30 (e.g., including model hyperparameters 32) to such an ML platform user via the programmatic API, where origination ML pipeline 14 can export trained model 28 and/or deployment ML pipeline 30 (e.g., including model hyperparameters 32) for deployment of trained model 28 with (e.g., using) deployment ML pipeline 30.

In one example user journey, a user can supply a set of training data 12 (e.g., which may be structured as data for each of a number of features for each of a number of examples). For instance, training data 12 can include and/or constitute a structured training dataset having data associated with a number of labels. The user can select one of the features as a label (e.g., the feature to be predicted by trained model 28), which may start the search for the best machine learning model. In some implementations, the user may also specify other "advanced" settings from the UI, such as: excluding features, changing feature types, details of the ML task (e.g., corresponding to a problem statement), and details of the search constraints (e.g., corresponding to parameters of an optimization domain associated with a model architecture search). As referenced herein, an "optimization domain" can refer to a list of parameters, their domain (e.g., valid values), and the relationship between them (e.g., one parameter may be conditioned on another one) for an underlying parameterized model.

In some implementations, origination ML pipeline 14 described with reference to FIG. 1 can include and/or otherwise be associated with one or more components that can perform one or more operations associated with data import 16, select signals 18, statistics generation and inter-face 20, data validation and feature engineering 22, and/or model architecture search 24. In one or more implementations of the present disclosure, such one or more components that can be included in and/or otherwise associated with origination ML pipeline 14 can leverage one or more capabilities of one or more libraries that can be accessed by and/or can provide the base functionality of such one or more components as described below.

Figure 2:
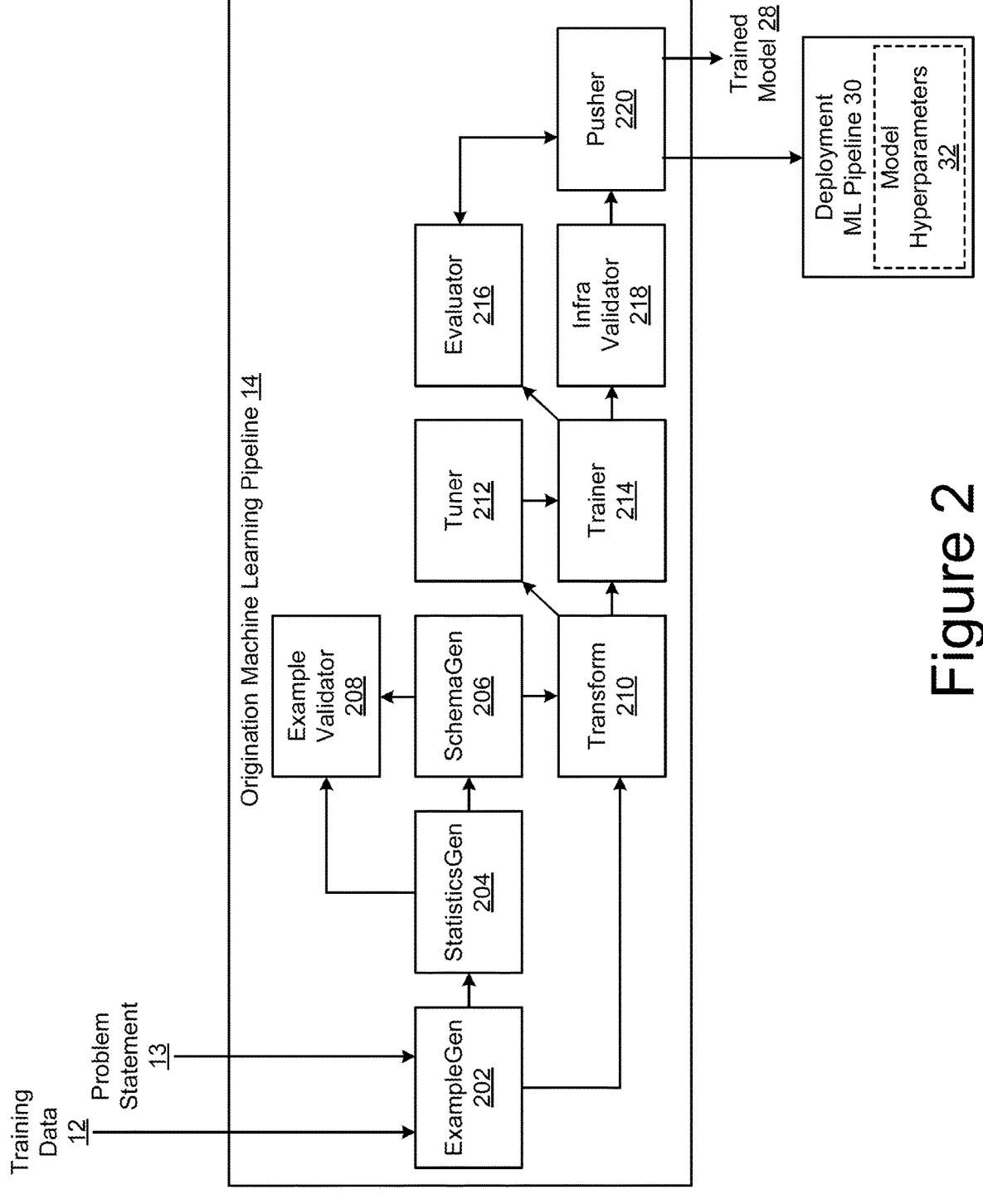
FIG. 2 depicts a block diagram of an example origination machine learning pipeline according to example implementations of the present disclosure.

FIG. 2 depicts an example, non-limiting alternative implementation of origination ML pipeline 14. The example origination ML pipeline 14 illustrated in FIG. 2 can be configured to receive training data 12 and, optionally, problem statement 13 from a user (e.g., via a GUI, an API, a REST API, a programmatic API, etc.). Execution of origination ML pipeline 14 illustrated in FIG. 2 can result in generation and exportation of trained model 28 (e.g., exportation via a GUI, an API, a REST API, a programmatic API, etc.). In at least one implementation, execution of origination ML pipeline 14 illustrated in FIG. 2 can result in generation and exportation (e.g., via a GUI, an API, a REST API, a programmatic API, etc.) of trained model 28 and/or deployment ML pipeline 30 (e.g., including model hyperparameters 32). The example origination ML pipeline 14 and deployment ML pipeline 30 depicted in FIG. 2 can each include computer-readable code that automates the workflow it takes to produce and/or run trained model 28 (e.g., to define, launch, and/or monitor trained model 28).

As illustrated in the example implementation depicted in FIG. 2, origination ML pipeline 14 can include an ExampleGen component 202, a StatisticsGen component 204, a SchemaGen component 206, an Example Validator component 208, a Transform component 210, a Tuner component 212, a Trainer component 214, an Evaluator component 216, an Infra Validator component 218, and/or a Pusher component 220. The example implementation depicted in FIG. 2 illustrates how data can flow between such components of origination ML pipeline 14.

In the example implementation depicted in FIG. 2, ExampleGen component 202 can be configured to receive and format training data 12 and, optionally, problem statement 13 to a format compatible to facilitate one or more operations of one or more components of origination ML pipeline 14. In some implementations, ExampleGen component 202 can be configured to perform such formatting after it splits training data 12 into training and evaluation datasets, which results in two copies of ExampleGen component 202, one each for training and evaluation.

In some implementations, a custom component can be added to origination ML pipeline 14. For example, the custom component can use various relevant data slices from ExampleGen component 202 and/or Trainer component 214 as input to origination ML pipeline 14 and generate and export a trained candidate machine learning model with the top candidate signals. The output produced by the custom component can then be used by downstream components of origination ML pipeline 14, such as one or more capabilities of a library (e.g., a Tensorflow library).

In the example implementation depicted in FIG. 2, Trainer component 214 can be configured to train a candidate model. For example, in some implementations, Trainer component 214 can be configured to receive the above-described Saved-Model, candidate model, and/or one or more parameters and/or hyperparameters of the candidate model from Transform component 210 and/or Tuner component 212. In these implementations, the SavedModel and/or candidate model can include all the data engineering transformations that were created by Transform component 210 such that the identical transforms can be performed using the exact same computer-readable code during both training and inference (e.g., the above-described computer-readable code that can be included in and/or used by origination ML pipeline 14 to automate the workflow it takes to produce and/or run trained model 28). In these implementations, by using such exact same computer-readable code (also referred to herein as "modeling code"), including the SavedModel and/or candidate model, Trainer component 214 can consume training data 12 (e.g., training data 12 that has been split into training and evaluation data) and train the candidate model.

In some implementations, to train a candidate model, Trainer component 214 can be configured to leverage one or more capabilities of one or more libraries that can be accessed by and/or can provide the base functionality of Trainer component 214. For example, in these implementations, Trainer component 214 can be configured to leverage one or more capabilities of one or more libraries written in the Python programming language that provide the base functionality of Trainer component 214. For instance, in one or more implementations, Trainer component 214 can be configured to leverage one or more capabilities of a library (e.g., a tensorflow library) that ingests training data and modeling code and creates a SavedModel result. In these one or more implementations, such a library can also integrate a feature engineering pipeline that can be created by Transform component 210 to preprocess input data (e.g., training data 12).

In implementations involving an Estimator based model, Trainer component 214 can be configured to save a trained candidate model as both a SavedModel and an "EvalSaved-Model" that becomes the basis for the analysis performed by Evaluator component 216 as described below. In these implementations, saving such a trained candidate model as an EvalSavedModel ensures the metrics used at training time are also available during evaluation by Evaluator component 216. In these implementations, to facilitate saving the trained candidate model as an EvalSavedModel, Trainer component 214 can be configured to leverage one or more capabilities of a library that can be accessed by and/or can provide the functionality of Trainer component 214. For example, in these implementations, Trainer component 214 can be configured to leverage one or more capabilities of a model analysis library described below with reference to Evaluator component 216.

Example Deployment Machine Learning Pipeline

Figure 3:
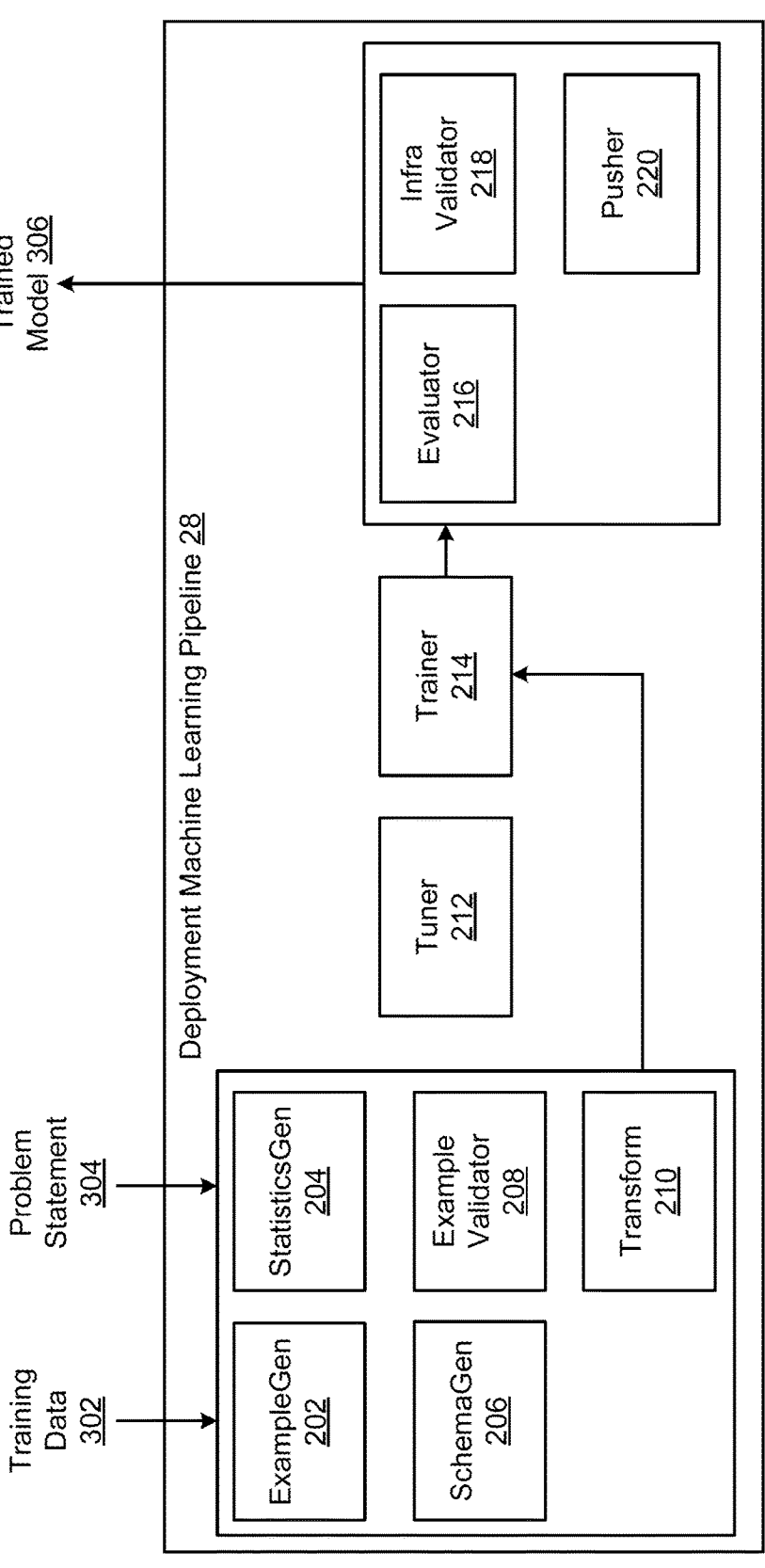
FIG. 3 depicts a block diagram of an example deployment machine learning pipeline according to example implementations of the present disclosure.

FIG. 3 depicts an example, non-limiting implementation of deployment ML pipeline 30. The example deployment ML pipeline 30 illustrated in FIG. 3 can be configured to receive training data 302 and, optionally, problem statement 304 from a user (e.g., via a GUI, an API, a REST API, a programmatic API, etc.). Execution of deployment ML pipeline 30 illustrated in FIG. 3 can result in generation and exportation of trained model 306 (e.g., exportation via a GUI, an API, a REST API, a programmatic API, etc.). The example deployment ML pipeline 30 depicted in FIG. 3 can include computer-readable code that automates the workflow it takes to produce and/or run trained model 306 (e.g., to define, launch, and/or monitor trained model 306).

As illustrated in the example implementation depicted in FIG. 3, deployment ML pipeline 30 can include Example-Gen component 202, StatisticsGen component 204, SchemaGen component 206, Example Validator component 208, Transform component 210, Tuner component 212, Trainer component 214, Evaluator component 216, Infra Validator component 218, and/or Pusher component 220, which can perform their respective operations in the same manner as described above with reference to FIG. 2. The example implementation depicted in FIG. 3 illustrates how data can flow between such components of deployment ML pipeline 30.

In the example implementation illustrated in FIG. 3, Trainer component 214 can be configured to retrain an ML model. For example, in this implementation, following execution of origination ML pipeline 14 to generate and/or deploy trained model 28 and/or deployment ML pipeline 30 (e.g., including model hyperparameters 30) as described above with reference to FIG. 2, Trainer component 214 can retrain trained model 28 based on (e.g., using) training data 302 and, optionally, problem statement 304. In this implementation, training data 302 can include training data that is different from that of training data 12 and/or problem statement 304 can include a problem definition that is different from that of problem statement 13.

In the example implementation depicted in FIG. 3, ExampleGen component 202, StatisticsGen component 204, SchemaGen component 206, Example Validator component 208, and/or Transform component 210 can be configured to perform their respective operations (e.g., operations described above with reference to FIG. 2) on training data 302 and/or problem statement 304 in the same manner as they performed such operations on training data 12 and/or problem statement 13. In this implementation, based on the respective outputs of such components that can be produced for training data 302 and, optionally, problem statement 304, Trainer component 214 can use such outputs to retrain trained model 28 and thereby produce trained model 306. In some implementations of the present disclosure, Trainer component 214 can be configured to retrain trained model 28 with (e.g., using) a fixed list of feature columns and thereby produce trained model 306. In the example implementation depicted in FIG. 3, Evaluator component 216, Infra Validator component 218, and/or Pusher component 220 can be configured to perform their respective operations (e.g., operations described above with reference to FIG. 2) on trained model 306 such that after a satisfactory evaluation of trained model 306 (e.g., via Evaluator component 216) and a satisfactory evaluation of a target deployment infrastructure (e.g., via Infra Validator 218), Pusher component 220 can deploy trained model 306 to the target deployment infrastructure.

Example Deployment Machine Learning Pipeline

Figure 4:
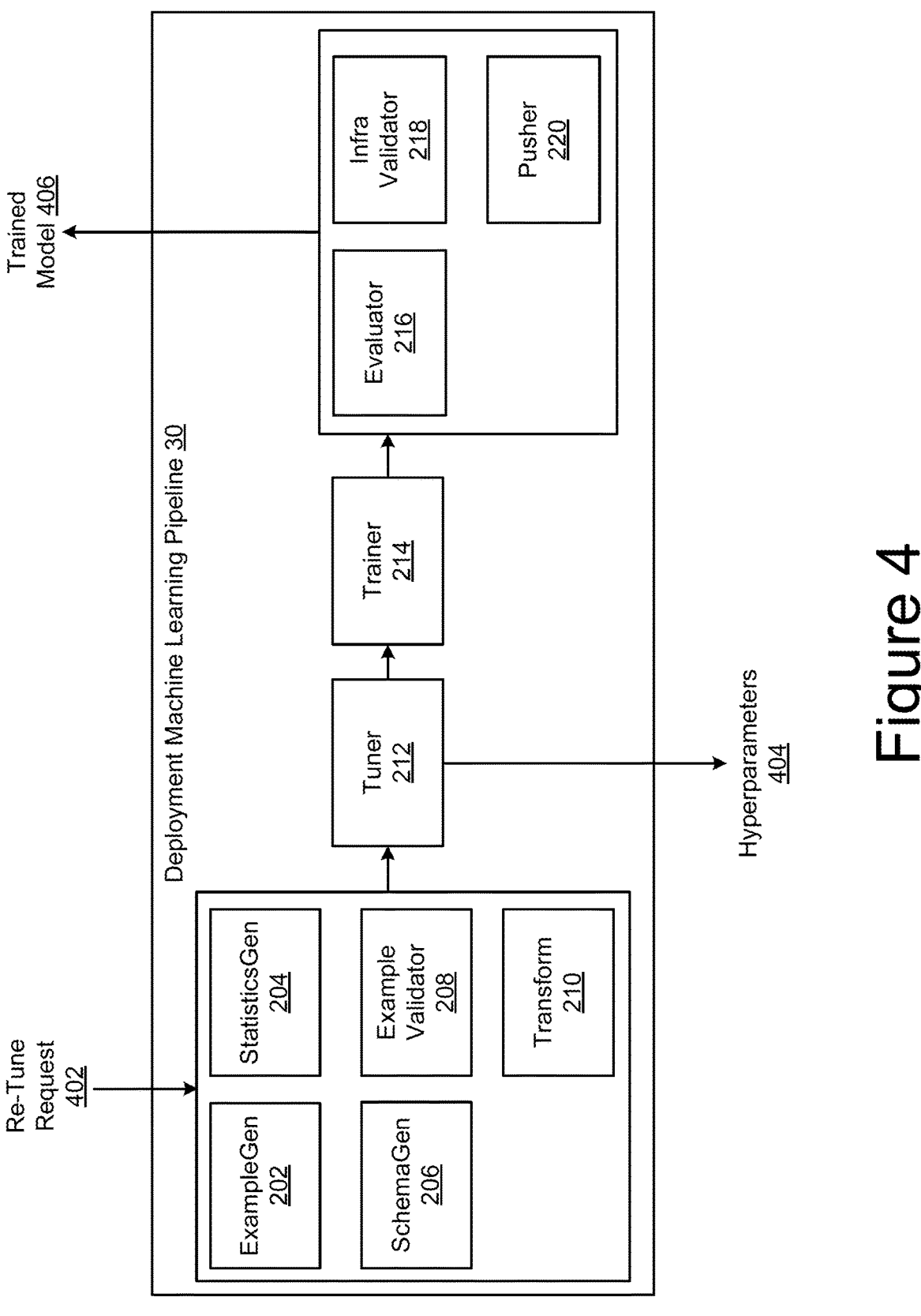
FIG. 4 depicts a block diagram of an example deployment machine learning pipeline according to example implementations of the present disclosure.

FIG. 4 depicts an example, non-limiting alternative implementation of deployment ML pipeline 30. The example deployment ML pipeline 30 illustrated in FIG. 4 can be configured to receive a re-tune request 402 from a user (e.g., via a GUI, an API, a REST API, a programmatic API, etc.). In some implementations, re-tune request 402 can include training data 12 and, optionally, problem statement 13 and/or a different (e.g., new) problem statement. Execution of deployment ML pipeline 30 illustrated in FIG. 4 can result in generation and exportation of trained model 406 (e.g., exportation via a GUI, an API, a REST API, a programmatic API, etc.). In at least one implementation, execution of deployment ML pipeline 30 illustrated in FIG. 4 can result in generation and exportation (e.g., via a GUI, an API, a REST API, a programmatic API, etc.) of hyperparameters 404 and/or trained model 406. The example deployment ML pipeline 30 depicted in FIG. 4 can include computer-readable code that automates the workflow it takes to produce and/or run trained model 406 (e.g., to define, launch, and/or monitor trained model 406).

As illustrated in the example implementation depicted in FIG. 4, deployment ML pipeline 30 can include Example- Gen component 202, StatisticsGen component 204, SchemaGen component 206, Example Validator component 208, Transform component 210, Tuner component 212, Trainer component 214, Evaluator component 216, Infra Validator component 218, and/or Pusher component 220, which can perform their respective operations in the same manner as described above with reference to FIG. 2. The example implementation depicted in FIG. 4 illustrates how data can flow between such components of deployment ML pipeline 30.

In the example implementation illustrated in FIG. 4, Tuner component 212 can be configured to perform a second ML model architecture search to identify a new machine learning model (e.g., new parameters and/or hyperparameters such as, for instance, hyperparameters 404) for training data 12. For example, in this implementation, following execution of origination ML pipeline 14 to generate and/or deploy trained model 28 and/or deployment ML pipeline 30 (e.g., including model hyperparameters 32) as described above with reference to FIG. 2, Tuner component 212 can retune trained model 28 based on (e.g., using) training data 12 and, optionally, problem statement 13 and/or a different (e.g., new) problem statement.

In the example implementation depicted in FIG. 4, ExampleGen component 202, StatisticsGen component 204, SchemaGen component 206, Example Validator component 208, and/or Transform component 210 can be configured to perform their respective operations on training data 12, problem statement 13, and/or a different (e.g., new) problem statement in the same manner as they performed such operations in the example implementation described above with reference to FIG. 2. In this implementation, based on the respective outputs of such components that can be produced for training data 12 and, optionally, problem statement 13 and/or a different (e.g., new) problem statement, Tuner component 212 can use such outputs to retune trained model 28 and thereby produce hyperparameters 404 and/or trained model 406. In this implementation, to retune trained model 28, Tuner component 212 can be configured to perform a second (e.g., a new) ML model architecture search of an optimization domain as defined herein (e.g., the above-described optimization domain) to identify a new machine learning model (e.g., new parameters and/or hyperparameters such as, for instance, hyperparameters 404) for training data 12. For example, in this implementation, Tuner component 212 can be configured to perform the second ML model architecture search in the same manner as described above with reference to FIG. 2. In this implementation, based on performing the second ML model architecture search, Tuner component 212 can be configured to output hyperparameters 404 and/or trained model 406 (e.g., as a SavedModel), where trained model 406 can include hyperparameters 404. In the example implementation depicted in FIG. 4, Evaluator component 216, Infra Validator component 218, and/or Pusher component 220 can be configured to perform their respective operations (e.g., operations described above with reference to FIG. 2) on trained model 406 such that after a satisfactory evaluation of trained model 406 (e.g., via Evaluator component 216) and a satisfactory evaluation of a target deployment infrastructure (e.g., via Infra Validator 218), Pusher component 220 can deploy trained model 406 to the target deployment infrastructure.

Example Signal Selection

Figure 5:
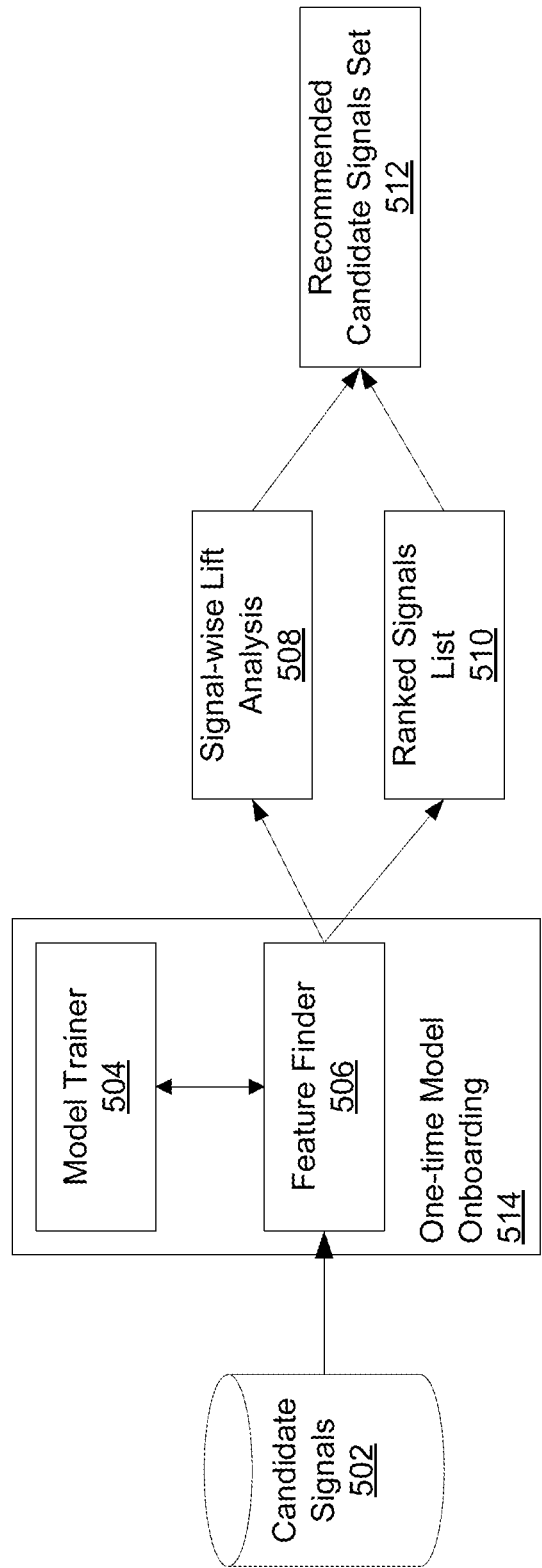
FIG. 5 depicts a block diagram of an example signal selection according to example implementations of the present disclosure.

FIG. 5 depicts an example, non-limiting implementation of select signals 18. The example select signals 18 illustrated in FIG. 5 can be configured to receive an import of candidate signals 502, from a user (e.g., via a GUI, an API, a REST API, a programmatic API, etc.). In this implementation, execution of select signals 18 automatically generates a ranked list of the recommended candidate signals 510 from the candidate signals 502. The candidate signals 502 can be a single candidate feature or signal, or a set of candidate features or signals. The ranked list of recommended candidate signals 510 can include the most impactful features or signals from the candidate signals 502 based on model performance lift, measured as a function of standard machine learning metrics or user specified custom metrics over a provided dataset, including signal-wise lift analysis 508. A recommended subset of candidate signals to be added to the machine learning model is provided to the user in recommended candidate signals set 512 based on ranked signals list 510.

In the example implementation depicted in FIG. 5, feature finder 506 provides an estimated impact of adding each feature or signal from candidate signals 502 in terms of the machine learning model performance lift. In this implementation, the expected machine learning model performance lift can be compared with the amount of resources required to produce the feature or signal in order to support software developers in making a decision on the required software developer investment needed. For example, by implementing feature finder 506, the software developer time required decreases from weeks to hours. In another example, by implementing feature finder 506, the total number of machine learning models trained decreases from O(2N) for a set of N new candidate features or signals in candidate signals 502 to O(1), thus decreasing turnaround time from weeks to days.

Figure 6:
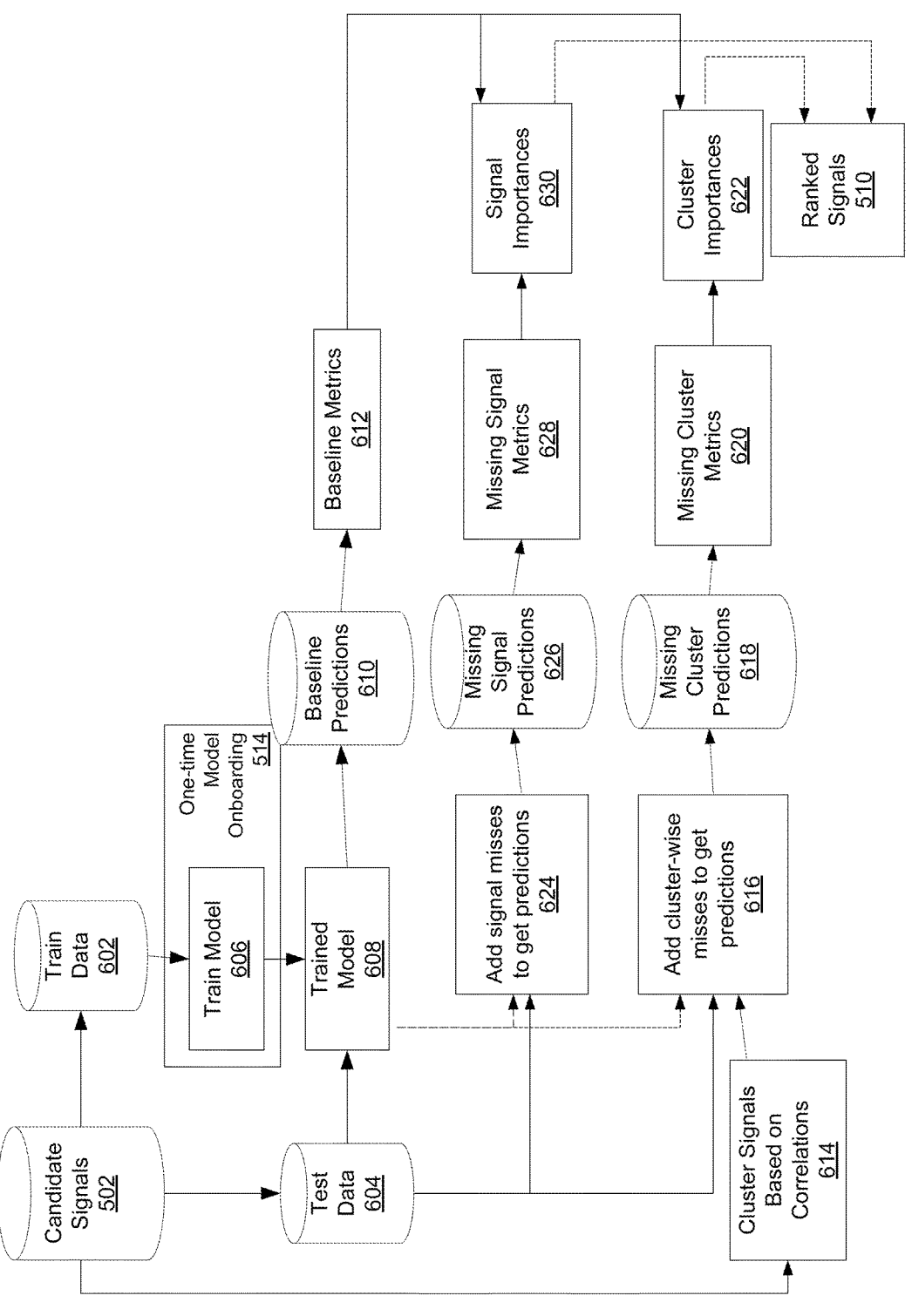
FIG. 6 depicts a block diagram of an example signal selection according to example implementations of the present disclosure.

FIG. 6 depicts an example, non-limiting implementation of select signals 18. The example select signals 18 illustrated in FIG. 6 can be configured to receive an import of candidate signals 502, from a user (e.g., via a GUI, an API, a REST API, a programmatic API, etc.). In this implementation, candidate signals 502 contains old signals which already exist in the machine learning model and new signals which are to be tested. The candidate signals 502 are divided into a set of train data 602 and a set of test data 604. In this implementation, the machine learning model is trained one time in one-time model onboarding 514 with train data 602.

In the example implementation depicted in FIG. 6, trained model 608 is used to generate baseline predictions 610 and baseline metrics 612. The baseline metrics 612 are used to compare with missing signal metrics 628 to determine signal importances 630 and with missing cluster metrics 620 to determine cluster importances 622. In this implementation, the machine learning model is tested with test data 604 and the metrics are computed (e.g., area under the precision-recall curve (AUC-PR), recall precision, good pass through rate, live abuse rate, etc.).

In the example implementation depicted in FIG. 6, correlations between contiguous-contiguous signal pairs and categorical-categorical signal pairs in candidate signals 502 are determined. In candidate signals 502, the contiguous signals include numerical signals that are not spatially discrete (e.g., height of a person) and the categorical signals include signals that can take on one of a limited number of possible values, with each signal assigned to a group or nominal category based on a qualitative property (e.g., country name). In this implementation, cluster signals based on correlations 614 determines the correlations between signal pairs, for example using Kendall's rank correlation coefficient to find contiguous-contiguous signal pairs and Cramer's V to find categorical-categorical signal pairs, resulting in one two-dimensional matrix with the correlations for contiguous signals and one two-dimensional matrix with the correlations for categorical signals.

In the example implementation depicted in FIG. 6, after the correlations between contiguous-contiguous signal pairs and categorical-categorical signal pairs in candidate signals 502 are determined, cluster signals based on correlations 614 groups all signals from candidate signals 502 into non-overlapping clusters based on the correlation matrices, with contiguous signals clustered separately from categorical signals. For example, correlation clustering can be used to cluster signals. Cluster signals based on correlations 614 can create a complete graph where the nodes are signals from candidate signals 502 and the weights of the edges between the nodes are the correlations. In some implementations, a threshold can be defined by the user with the edges with positive edges including the edges weights greater than the threshold and negative edges including all other edges. For example, a threshold of x indicates that signal pairs with a correlation greater than or equal to x are considered highly correlated. In this implementation, cluster signals based on correlations 614 finds a clustering that will maximize agreements (i.e., the sum of positive edge weights within a cluster plus the absolute value of the sum of negative edge weights between clusters). In this implementation, cluster signals based on correlations 614 groups signals in the same cluster when the signals are highly correlated to each other. Thus, the higher the correlation between two signals, the higher the chance of them being in the same group. In some implementations, cluster signals based on correlations 614 can make a cluster with only a single signal.

In the example implementation depicted in FIG. 6, add cluster-wise misses to get predictions 616 determines the missing signal importances to compare results when a signal value is useless and when it is not for each cluster from cluster signals based on correlations 614. In this implementation, all values of the signals in a cluster from cluster signals based on correlations 614 are replaced with Nan (i.e., the signal's values are missing) in the test data 604. Test data 604 with Nan values is input into trained model 608 and the output metrics are returned to add cluster-wise misses to get predictions 616. Following replacing the signal values, missing cluster predictions 618 determines the difference in the output performance metrics of the machine learning model compared with baseline metrics 612 to obtain missing cluster metrics 620. For example, if the metric is area under the precision-recall curve (AUC-PR), then the difference is AUCs for the baseline metrics 612 and the current case is the machine learning model performance lift. In this example, if the AUC for the missing-signal case is less than the AUC for the baseline case, then the machine learning model depended on that cluster to make predictions. In this implementation, the signal values in test data 604 are re-assigned with the signal's value from before the values were replaced with Nan. The cluster importance indicates the approximate signal importance that would be produced from one signal in that cluster if the other signals in that cluster were completely removed, resulting in cluster importances 622. In some implementations, if the clusters are ordered in decreasing order of missing cluster importances and the top signal (i.e., the signal with the highest individual signal importance in the cluster) from each cluster is chosen, then the good signals are obtained in the correct order of cluster importances 622.

In the example implementation depicted in FIG. 6, add signal misses to get predictions 624 determines the missing signal importances of each signal from test data 604 individually to compare the results of when a signal value is useless and when it is not for each signal. In this implementation, all values of the signals in test data 604 are replaced with Nan (i.e., the signal's values are missing). Test data 604 with Nan values is input into trained model 608 and the output metrics are returned to add signal misses to get predictions 624. Following replacing the signal values, missing signal predictions 626 determines the difference in the output performance metrics of the machine learning model compared with baseline metrics 612 to obtain missing signal metrics 628. For example, if the metric is area under the precision-recall curve (AUC-PR), then the difference is AUCs for the baseline metrics 612 and the current case is the machine learning model performance lift. In this example, if the AUC for the missing-signal case is less than the AUC for the baseline case, then the machine learning model depended on that signal to make predictions. In this implementation, the signal values in test data 604 are re-assigned with the signal's value from before the values were replaced with Nan. Individual signal importances 630 are thus determined after converting the signal's values to Nan and finding the machine learning model performance lift.

In the example implementation depicted in FIG. 6, the ranks of each signal in cluster importances 622 and signal importances 630 is determined and output in ranked signals 510. In this implementation, cluster importances 622 are sorted in a list of decreasing order of cluster importances. Following creating the list of sorted cluster importances, for each cluster in the list, if it is determined that the cluster has an old signal (i.e., the cluster has a signal which already exists in the machine learning model), then all other signals of the cluster (i.e., new signals) will be appended to a list of unimportant signals. However, if it is determined that the cluster does not have an old signal, then the signal with the highest individual signal importance in the cluster will be added to a list of ranked signals 510. In some implementations, when there are multiple signals with the same individual signal importance in the cluster, the signals will be appended to the list of ranked signals 510. When the cluster does not have an old signal, any remaining new signals after the preceding filtering will be appended to a list of unimportant signals. In some implementations, the user can specify a number of signals to be returned to the user, along with the importance of each signal. The user can be provided with the top signals from ranked signals list 510 and can specify the number of top signals to be returned.

Figure 7:
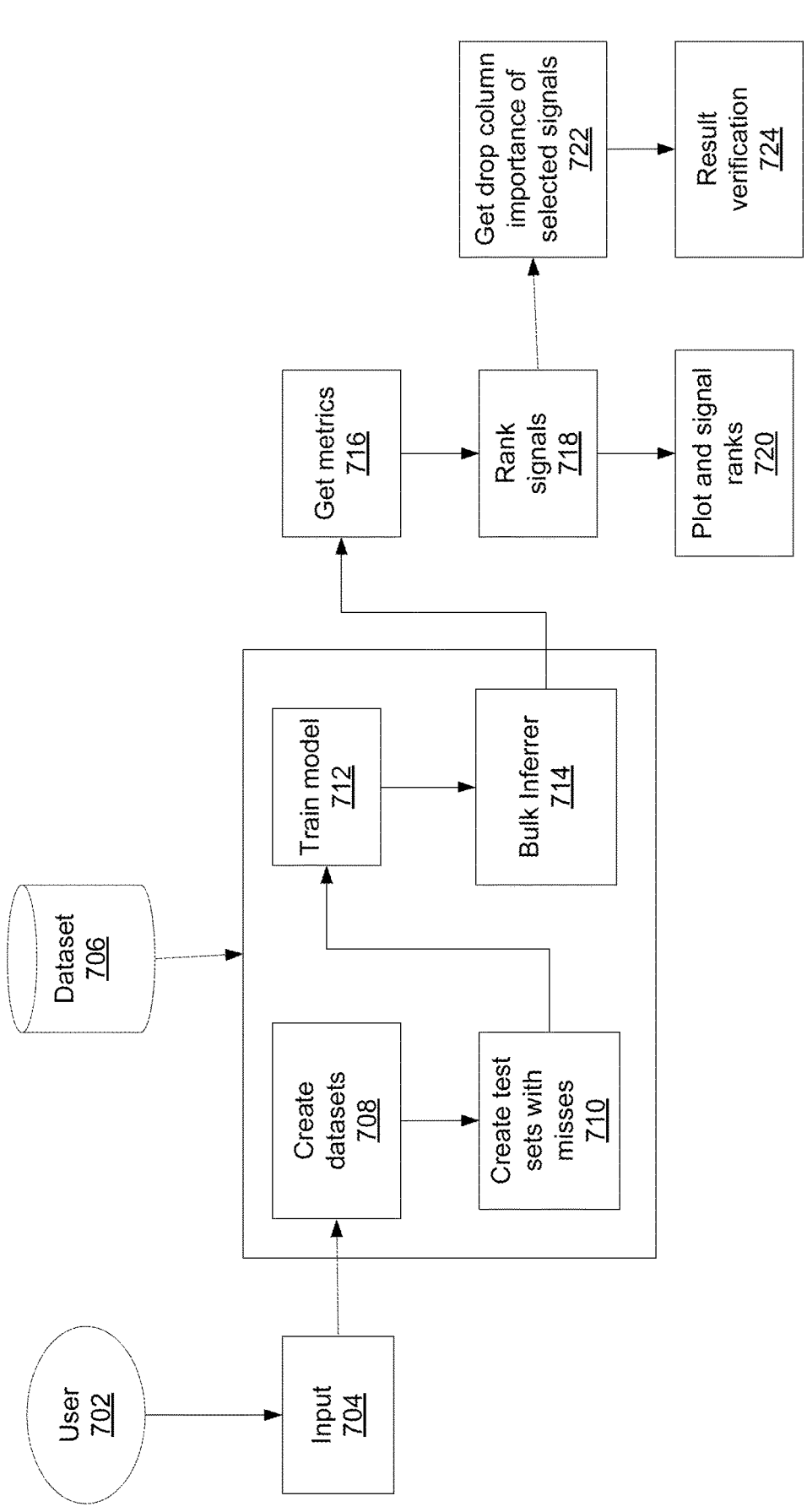
FIG. 7 depicts a block diagram of an example signal selection according to example implementations of the present disclosure.

FIG. 7 depicts an example, non-limiting implementation of select signals 18. The example select signals 18 illustrated in FIG. 7 can be configured to receive an import of candidate signals 502, from a user 702 (e.g., via a GUI, an API, a REST API, a programmatic API, etc.). In this implementation, user 702 can input 704 the CNS path to the dataset of old and new signals, the base path for the TensorFlow Extended pipeline, parameters for clustering, and/or parameters for metric calculations.

In the example implementation depicted in FIG. 7, dataset 706 is created in create datasets 708 by joining the datasets with old signals, which were already in the machine learning model, with new signals. Dataset 706 is divided into two datasets, a train dataset 602 and test dataset 604. Create test set with misses 710 clusters signals to create multiple test datasets 604 based on the clusters and signals that are in the dataset, then the datasets are written to specified CNS paths. Test datasets 604 each contain either one cluster or one new missing signal.

In the example implementation depicted in FIG. 7, train model 712 trains the machine learning model with train data 602 and test data 604. Bulk inferrer 714 is automatically triggered following train model 712 to score all of the missing-signal datasets (i.e., the signal's values are missing in the dataset).

In the example implementation depicted in FIG. 7, scores for signal misses from missing signal metrics 628 and the baseline metrics 612 are retrieved by get metrics 716 to computer performance metrics for all test sets. Following receiving the metrics, rank signals 718 outputs plot and rank signals 720 with the rank of all signals according to the signal's estimated machine learning model performance lift, the number of top signals specified by the user, and the plots for different kinds of metrics. In some implementations, the user can choose certain slices of the datasets and obtain their respective results.

In the example implementation depicted in FIG. 7, the drop column importance of the set of selected signals 722 is determined to verify the results 724. In this implementation, the drop column importance is found for the number of top signals specified by the user and output by rank signals 718. For example, the machine learning model is trained with the old signals and then with the selected top signals, the machine learning model is run on the test data, metrics are computed, and the metrics are compared with that of the production machine learning model.

Example Devices and Systems

Figure 8A:
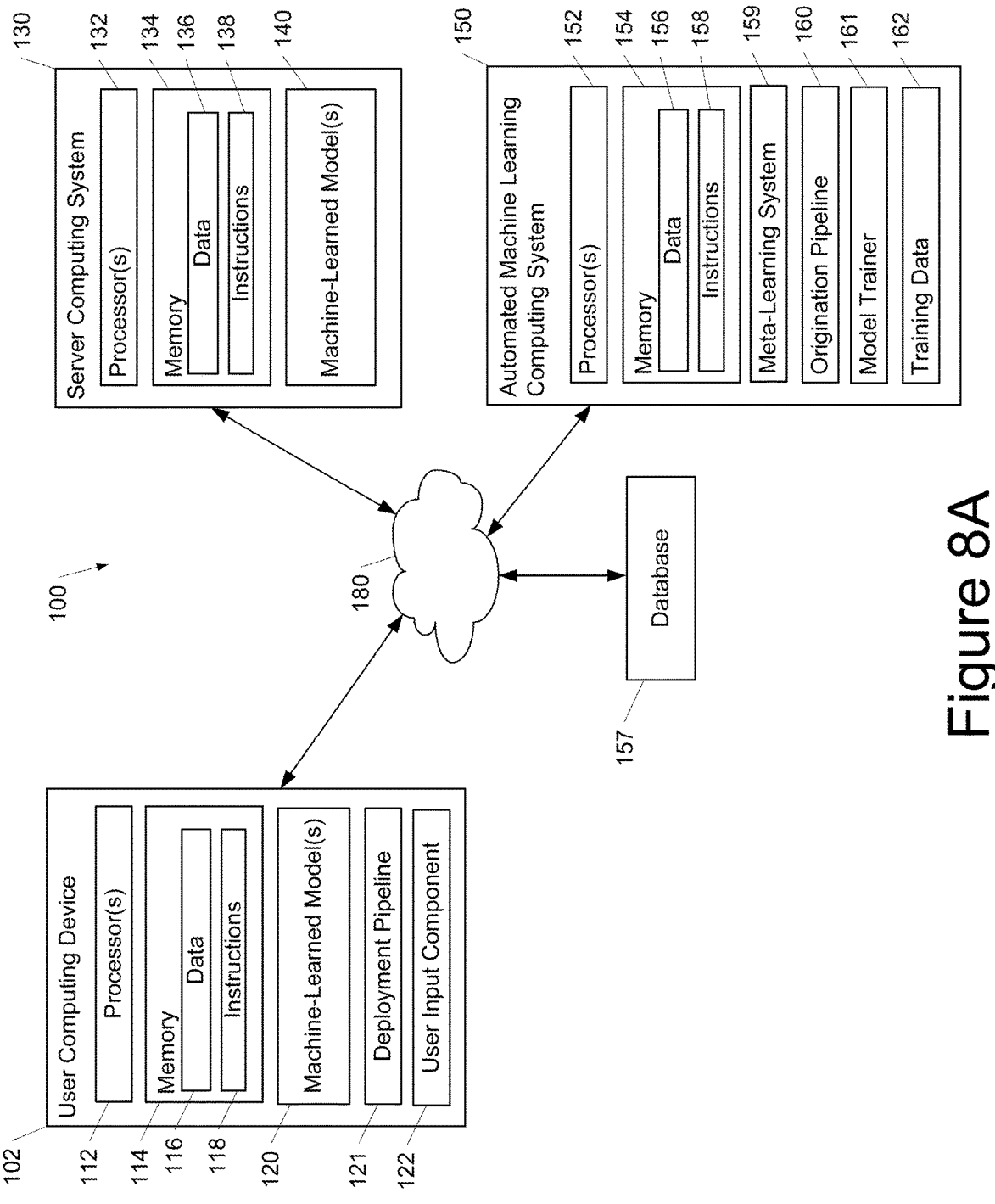
FIG. 8A depicts a block diagram of an example computing system according to example implementations of the present disclosure.

FIG. 8A depicts a block diagram of an example computing system 100 according to example implementations of the present disclosure. The system 100 includes a user computing device 102, a server computing system 130, and an automated machine learning system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120 and one or more deployment pipelines 121 that enable deployment of the models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 and corresponding origination and deployment pipelines are discussed with reference to FIGS. 1-4.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally, or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140 and one or more deployment pipelines 141 that enable deployment of the models 141. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 and corresponding origination and deployment pipelines are discussed with reference to FIGS. 1-4.

The user computing device 102 and/or the server computing system 130 can train the models 120 and/or 140 via interaction with the automated machine learning system 150 that is communicatively coupled over the network 180. The automated machine learning system 150 can be separate from the server computing system 130 or can be a portion of the server computing system 130.

The automated machine learning system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the automated machine learning system 150 to perform operations. In some implementations, the automated machine learning system 150 includes or is otherwise implemented by one or more server computing devices.

The automated machine learning system 150 can be in communication with a database 157 that contains datasets associated with a number of different tasks and/or domains. The database 157 can be used to provide an improved benchmarking system. The benchmarking system can be used with the automated model and pipeline generation tools described herein, but can also be used by any other models or systems. In particular, example model benchmarking systems provided by the present disclosure can include a large number (e.g., hundreds, thousands, etc.) of different datasets (e.g., training datasets, validation datasets, etc.) and associated metadata that correspond to a number of different machine-learning tasks (e.g., classification tasks, generative tasks, vision tasks, etc.) or domains (e.g., imagery, text, audio, natural language, sensor data, statistical data, etc.). As examples, the metadata associated with each dataset can include: (a) properties of the dataset; (b) problem statements; (c) feature engineering transformations; (d) hyperparameter search space; (e) training logs and signals; and/or (f) model quality metrics associated with each combination of hyperparameters.

These datasets can be stored in the database 157 and can be used to build a testing framework to test the quality of the automated machine learning system 150 in a rigorous and systematic way. For example, each time the automated machine learning system 150 is changed or altered, its performance can be measured against the datasets included in the database 157. For example, the performance of respective models automatically generated by the automated system can be measured against some portion (e.g., all) of the different tasks or domains. That is, a new version of an automated machine learning system 150 can be used to generate one or more new machine learning models for one or more datasets/tasks/domains included in the database 157. The performance of these models can be compared to the performance of other models generated by past versions of the system or other systems. The performance of the new models versus the previous models can be used as a proxy for measuring an improvement in or otherwise understanding the performance of the automated machine learning system 150.

In such fashion, the benchmarking tools described herein can provide for consistent and comparable performance benchmarking not only for specific models, but also for a larger system that seeks to automate aspects of the machine learning process (e.g., architecture searches, etc.). Furthermore, because the database 157 can include data for many different tasks or domains, the performance of the automated machine learning system 150 can be measured and optimized across such different tasks or domains or subsets thereof (e.g., user-defined subsets).

The automated machine learning system 150 can also include or be in communication with a meta-learning system 159. The meta-learning system 159 for automated machine learning system 150 can iteratively improve the automated machine learning system 150. More particularly, the automated machine learning system 150 can itself be considered to be meta-learning system 159 in which the automated machine learning system 150 is an "outer loop" that iteratively changes various aspects (e.g., architecture, hyperparameters, etc.) of the model training or generation process (i.e., the "inner loop" executed by model trainer 161) to optimize the model training or generation process, which in turn optimizes the final outputted model. The meta-learning system 159 described herein can be yet another "outer loop" around the automated machine learning system 150. For example, as described in the paragraphs above, a benchmarking system and database 157 can store hundreds or thousands of machine learning datasets for different tasks or domains. The meta-learning system 159 for automated machine learning system 150 can track metadata for every task such that the meta-learning system 159 can apply the principles of iterative testing, learning, and improvement on the automated machine learning system 150.

Thus, the parameters or hyperparameters (e.g., system settings such as, for example, number of training iterations) of the automated machine learning system 150 can be tuned (e.g., automatically tuned according to learning-based or black box optimization approaches) over time to continuously improve performance of the automated machine learning system and/or to enable high quality initial performance for new datasets. As one example, the meta-learning system 159 for automated machine learning system 150 can predict system settings for the automated machine learning system 150 to be applied to a new dataset based on characteristics of the new dataset. For example, statistical measures for the new dataset can be evaluated. Prior datasets that have similar statistical measures can be identified. The system settings that resulted in best performance for such prior datasets can be used as the initial settings for application of the automated machine learning system to the new dataset. For example, the system settings that resulted in best performance for such prior datasets can be averaged (e.g., a weighted average).

In a further example, the meta-learning system 159 for automated machine learning system 150 can include a machine-learned model (e.g., a neural network) that is trained to predict parameter or hyperparameter (e.g., system settings) for the automated machine learning system to be applied with respect to generation of a model for a new dataset. For example, the new dataset can be provided as input to the machine-learned model and, in one example, the machine-learned model can directly predict the hyperparameter values. In another example, the machine-learned model can generate a dataset embedding for the new dataset within an embedding space that encodes latent information about datasets. In such example, other previous datasets that have embeddings that are similar (e.g., close in distance measure) to the embedding generated for the new dataset can be identified. The system settings that resulted in best performance for such prior datasets can be used as the initial settings for application of the automated machine learning system to the new dataset. For example, the system settings that resulted in best performance for such prior datasets can be averaged (e.g., a weighted average).

In further examples, an ensemble of neural networks can be trained on a dataset of previously trained model hyper-parameters from all "related" prior searches. For example, each neural network in the ensemble can take as input a collection of tuples (e.g., model hyper-parameters, dataset properties), and output (predicted mean, predicted standard deviation) of the objective value. For example, each network can be trained to maximize the log likelihood of the true objective values of all trained models across all prior searches. In some implementations, each neural network can be trained separately from an independently sampled random initialization. At prediction time, the predictions of the neural networks can be ensembled to a single prediction. More precisely, in some examples, the ensemble distribution is a uniform mixture of Gaussian distributions, each of which is produced by a neural network. One example formula (via Bayesian model averaging) is: ensemble mean=mean of predicted means; ensemble standard deviation=mean of (predicted mean ^2+predicted standard deviation ^2)−ensemble mean ^2. The more disagreement there is among the ensemble members, the higher ensemble standard deviation will be, as desired.

The automated machine learning system 150 can include an origination pipeline 160. The origination pipeline 160 can be used to generate the models and/or deployment pipelines. The origination pipeline 160 can operate as described with reference to FIG. 1 and/or FIG. 2.

The automated machine learning system 150 can include a model trainer 161 that trains the machine-learned models 120 and/or 140 stored at the user computing device 102 and/or the server computing system 130 using various training or learning techniques, such as, for example, back-wards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 161 can perform a number of generalization techniques (e.g., weight decays, dropouts, etc.) to improve the generalization capability of the models being trained.

In particular, the model trainer 161 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the automated machine learning system 150 on user-specific data received from the user computing device 102. In some instances, this process can be referred to as personalizing the model.

The model trainer 161 includes computer logic utilized to provide desired functionality. The model trainer 161 can be implemented in hardware, firmware, and/or software con-trolling a general-purpose processor. For example, in some implementations, the model trainer 161 includes program files stored on a storage device, loaded into a memory and executed by one or more processors. In other implementations, the model trainer 161 includes one or more sets of computer-executable instructions that are stored in a tan-gible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specifica-tion may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded represen-tation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 8A illustrates one example computing system that can be used to implement the present disclosure. Other computing systems can be used as well. For example, in some implementations, the user computing device 102 can include the model trainer 161 and the training dataset 162. In such implementations, the models 120 can be both trained and used locally at the user computing device 102. In some of such implementations, the user computing device 102 can implement the model trainer 161 to personalize the models 120 based on user-specific data.

Figure 8B:
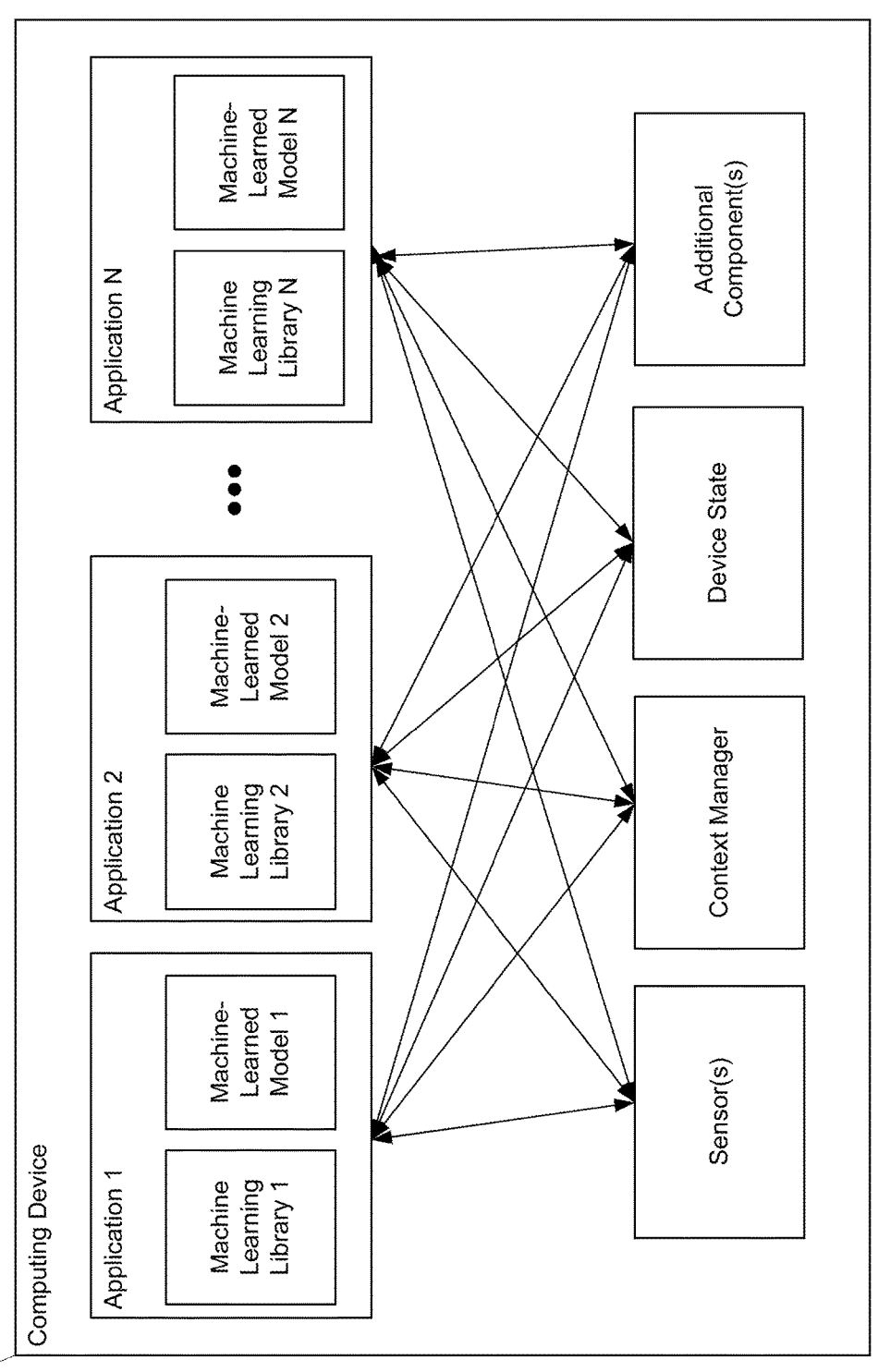
FIG. 8B depicts a block diagram of an example computing device according to example implementations of the present disclosure.

FIG. 8B depicts a block diagram of an example computing device 10 that performs according to example implementations of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 8B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 8C:
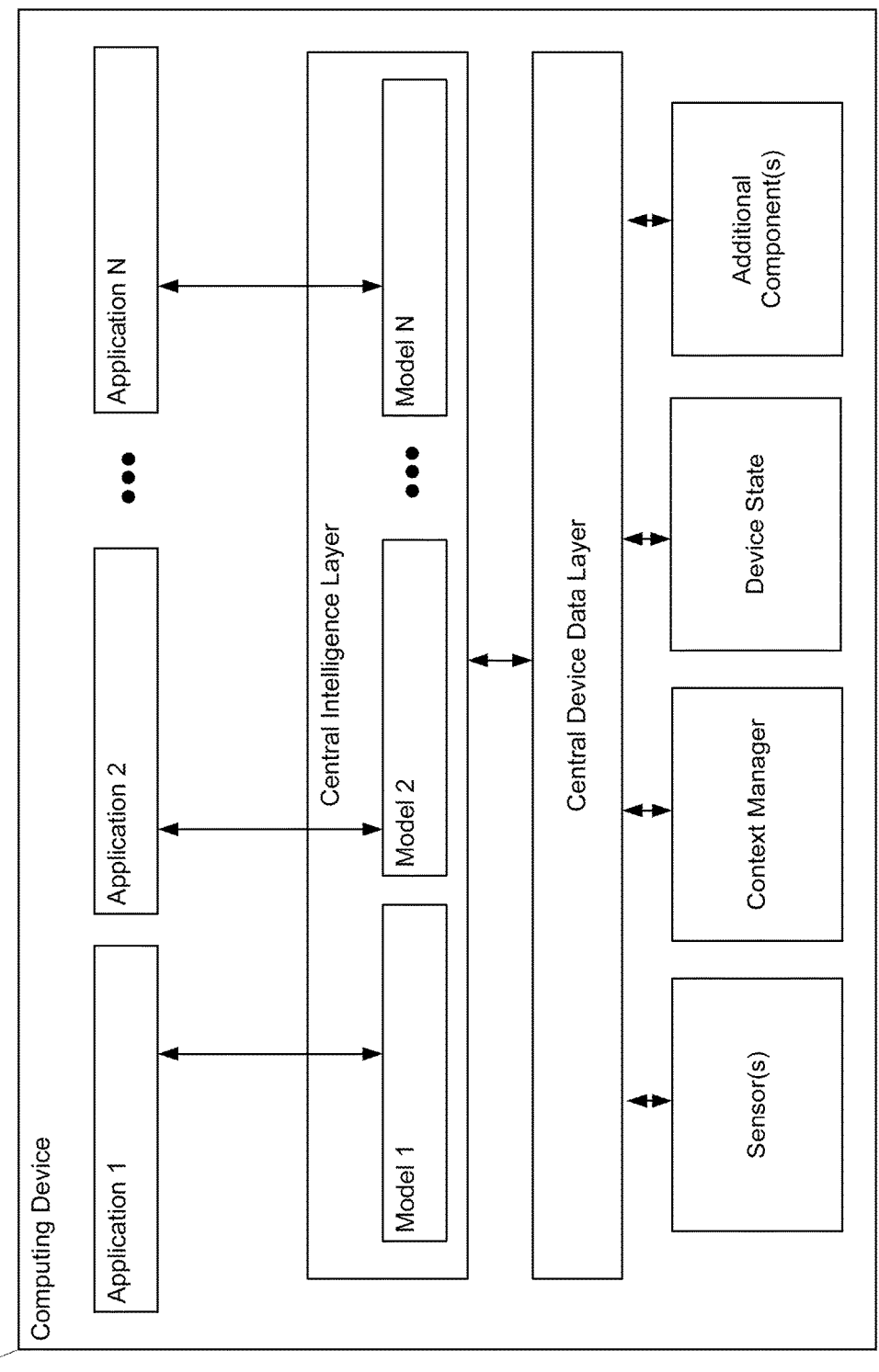
FIG. 8C depicts a block diagram of an example computing device according to example implementations of the present disclosure.

FIG. 8C depicts a block diagram of an example computing device 50 that performs according to example implementations of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 8C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 8C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example implementations thereof, each example is provided by way of explanation, not limitation of the disclosure. Those skilled in the art, upon attaining an understanding of the foregoing, can readily produce alterations to, variations of, and equivalents to such implementations. Accordingly, the subject disclosure does not preclude inclusion of such modifications, variations and/or additions to the present subject matter as would be readily apparent to one of ordinary skill in the art. For instance, features illustrated or described as part of one implementation can be used with another implementation to yield a still further implementation. Thus, it is intended that the present disclosure cover such alterations, variations, and equivalents.

What is claimed is:

1. A computing system for automatic analysis of signals for machine learning models, the computing system comprising:
one or more processors; and
one or more non-transitory computer-readable media that collectively store instructions that, when executed by the one or more processors, cause the computing system to perform operations, the operations comprising:
importing a training dataset associated with a user, wherein the training dataset comprises one or more candidate features, and the one or more candidate features are each associated with one of one or more candidate signals;
training a machine learning model using the training dataset;
generating baseline metrics for the machine learning model;
identifying one or more correlations between the one or more candidate signals in the training dataset;
grouping the one or more candidate signals into one or more clusters based on the one or more correlations;
for each respective cluster of the one or more clusters:
identifying an importance of the respective cluster, wherein the importance of the respective cluster is indicative of a first estimated performance lift to the machine learning model associated with the respective cluster;
for each respective candidate signal of the one or more candidate signals:
identifying the importance of the respective candidate signal, wherein the importance of the respective candidate signal is indicative of a second estimated performance lift to the machine learning model associated with adding the respective candidate signal as an input to the machine learning model; and
returning a list of the one or more candidate signals and the importance of the respective candidate signal of the one or more candidate signals in decreasing order of machine learning model performance lift based on the importance of the respective cluster associated with the one or more candidate signals and the importance of the respective candidate signal.

2. The computing system of claim 1, wherein:
the operations further comprise:
combining the signals which already exist in the machine learning model with the one or more candidate signals; and
dividing the training dataset into test datasets and train datasets.

3. The computing system of claim 1, wherein identifying correlations between the one or more candidate signals comprises determining correlations for contiguous-contiguous signal pairs and for categorical-categorical signal pairs.

4. The computing system of claim 1, wherein grouping the one or more candidate signals into one or more clusters based on their one or more correlations comprises:

creating a graph, wherein nodes of the graph are the one or more candidate signals and a weight of each edge between the nodes is the correlation between the one or more candidate signals; and grouping the one or more candidate signals into the one or more clusters that maximize a number of agreements.

5. The computing system of claim 1, wherein identifying the importance of the respective cluster comprises:

for the respective cluster:

for the respective signal in the respective cluster:

replacing all values in a test dataset with Nan;

entering the test dataset into the trained machine learning model;

exporting metrics output by the trained machine learning model;

comparing the metrics output by the trained machine learning model with the baseline metrics to determine performance lift; and for the respective signal in the respective cluster:

assigning the values in the test dataset with the respective signal's value before replacing all values in the test dataset with Nan.

6. The computing system of claim 1, wherein identifying the importance of the respective candidate signal of the one or more candidate signals comprises:

for each respective candidate signal:

replacing all values in a column of a test dataset with Nan;

entering the test dataset into the trained machine learning model;

exporting metrics output by the trained machine learning model;

comparing the metrics output by the trained machine learning model with the baseline metrics to determine performance lift; and assigning the values in the test dataset with the signal's value before replacing all values in the test dataset with Nan.

7. The computing system of claim 1, wherein returning a list of the one or more candidate signals and the importance of the respective candidate signal of the one or more candidate signals in decreasing order of machine learning model performance lift based on the importance of the respective cluster associated with the one or more candidate signals and the importance of the respective candidate signal comprises:

sorting the importance of the respective cluster into a ranked list of cluster importances in descending order of importance;

for the respective cluster in the ranked list of cluster importance:

appending all new signals of the respective cluster to a list of unimportant signals when the respective cluster has a signal which already exists in the machine learning model;

selecting the signal with the highest individual signal importance from the respective cluster when the respective cluster does not have a signal which already exists in the machine learning model;

appending the signal with the highest individual signal importance and all signals with the same individual signal importances to a ranked list of signal importances when the respective cluster does not have the signal which already exists in the machine learning model; and appending the all new signals of the cluster to the list of unimportant signals when the cluster has the signal which already exists in the machine learning model and when the new signal is not appended to the ranked list of signal importances;

exporting the top signals and the signal importance from the ranked list of signal importances.

8. The computing system of claim 7, wherein a user can specify a number of top signals and the importance of the respective candidate signal of the one or more candidate signals to be exported.

9. A computer-implemented method for automatic analysis of signals for machine learning models, the method performed by one or more computing devices and comprising:

importing a training dataset associated with a user, wherein the training dataset comprises one or more candidate features, and the one or more candidate features are each associated with one of one or more candidate signals;

training a machine learning model using the training dataset;

generating baseline metrics for the machine learning model;

identifying one or more correlations between the one or more candidate signals in the training dataset;

grouping the one or more candidate signals into one or more clusters based on the one or more correlations;

for each respective cluster of the one or more clusters:

identifying an importance of the respective cluster, wherein the importance of the respective cluster is indicative of a first estimated performance lift to the machine learning model associated with the respective cluster;

for each respective candidate signal of the one or more candidate signals:

identifying the importance of the respective candidate signal, wherein the importance of the respective candidate signal is indicative of a second estimated performance lift to the machine learning model associated with adding the respective candidate signal as an input to the machine learning model; and returning a list of the one or more candidate signals and the importance of the respective candidate signal of the one or more candidate signals in decreasing order of machine learning model performance lift based on the importance of the respective cluster associated with the one or more candidate signals and the importance of the respective candidate signal.

10. The computing system of claim 1, wherein the first estimated performance lift is associated with adding at least one of the one or more candidate signals as an input to the machine learning model from the respective cluster.

11. The computing system of claim 1, wherein the baseline metrics for the machine learning model are indicative of a precision and a recall of the machine learning model.

12. The computer-implemented method of claim 9, wherein:

the operations further comprise:

combining the signals which already exist in the machine learning model with the one or more candidate signals; and dividing the training dataset into test datasets and train datasets.

13. The computer-implemented method of claim 9, wherein identifying correlations between the one or more candidate signals comprises determining correlations for contiguous-contiguous signal pairs and for categorical-categorical signal pairs.

14. The computer-implemented method of claim 9, wherein grouping the one or more candidate signals into one or more clusters based on their one or more correlations comprises:

creating a graph, wherein nodes of the graph are the one or more candidate signals and a weight of each edge between the nodes is the correlation between the one or more candidate signals; and grouping the one or more candidate signals into the one or more clusters that maximize a number of agreements.

15. The computer-implemented method of claim 14, wherein a cluster can contain a single element.

16. The computer-implemented method of claim 9, wherein identifying the importance of the respective cluster comprises:

for the respective cluster:

for the respective signal in the respective cluster:

replacing all values in a test dataset with Nan;

entering the test dataset into the trained machine learning model;

exporting metrics output by the trained machine learning model;

comparing the metrics output by the trained machine learning model with the baseline metrics to determine performance lift; and for the respective signal in the respective cluster:

assigning the values in the test dataset with the respective signal's value before replacing all values in the test dataset with Nan.

17. The computer-implemented method of claim 9, wherein identifying the importance of the respective candidate signal of the one or more candidate signals comprises:

for the respective signal:

replacing all values in a column of a test dataset with Nan;

entering the test dataset into the trained machine learning model;

exporting metrics output by the trained machine learning model;

comparing the metrics output by the trained machine learning model with the baseline metrics to determine performance lift; and assigning the values in the test dataset with the signal's value before replacing all values in the test dataset with Nan.

18. The computer-implemented method of claim 9, wherein returning a list of the one or more candidate signals and the importance of each respective candidate signal of the one or more candidate signals in decreasing order of machine learning model performance lift based on the importance of the respective cluster associated with the one or more candidate signals and the importance of the respective candidate signal comprises:

sorting the importance of the respective cluster into a ranked list of cluster importances in descending order of importance;

for the respective cluster in the ranked list of cluster importance:

appending all new signals of the respective cluster to a list of unimportant signals when the respective cluster has a signal which already exists in the machine learning model;

selecting the signal with the highest individual signal importance from the respective cluster when the respective cluster does not have a signal which already exists in the machine learning model;

appending the signal with the highest individual signal importance and all signals with the same individual signal importances to a ranked list of signal importances when the respective cluster does not have the signal which already exists in the machine learning model; and appending the all new signals of the cluster to the list of unimportant signals when the cluster has the signal which already exists in the machine learning model and when the new signal is not appended to the ranked list of signal importances;

exporting the top signals and the signal importance from the ranked list of signal importances.

19. The computer-implemented method of claim 18, wherein a user can specify a number of top signals and the importance of the respective candidate signal of the one or more candidate signals to be exported.

20. One or more non-transitory computer-readable media that collectively store instructions that, when executed by one or more processors of a computing system, cause the computing system to perform operations, the operations comprising:

importing a training dataset associated with a user, wherein the training dataset comprises one or more candidate features, and the one or more candidate features are each associated with one of one or more candidate signals;

training a machine learning model using the training dataset;

generating baseline metrics for the machine learning model;

identifying one or more correlations between the one or more candidate signals in the training dataset;

grouping the one or more candidate signals into one or more clusters based on the one or more correlations;

for each respective cluster of the one or more clusters:

identifying an importance of the respective cluster, wherein the importance of the respective cluster is indicative of a first estimated performance lift to the machine learning model associated with the respective cluster;

for each respective candidate signal of the one or more candidate signals:

identifying the importance of the respective candidate signal, wherein the importance of the respective candidate signal is indicative of a second estimated performance lift to the machine learning model associated with adding the respective candidate signal as an input to the machine learning model; and returning a list of the one or more candidate signals and the importance of the respective candidate signal of the one or more candidate signals in decreasing order of machine learning model performance lift based on the importance of the respective cluster associated with the one or more candidate signals and the importance of the respective candidate signal.

* * * * *